United States Patent Office 2,994,305
Patented Aug. 1, 1961

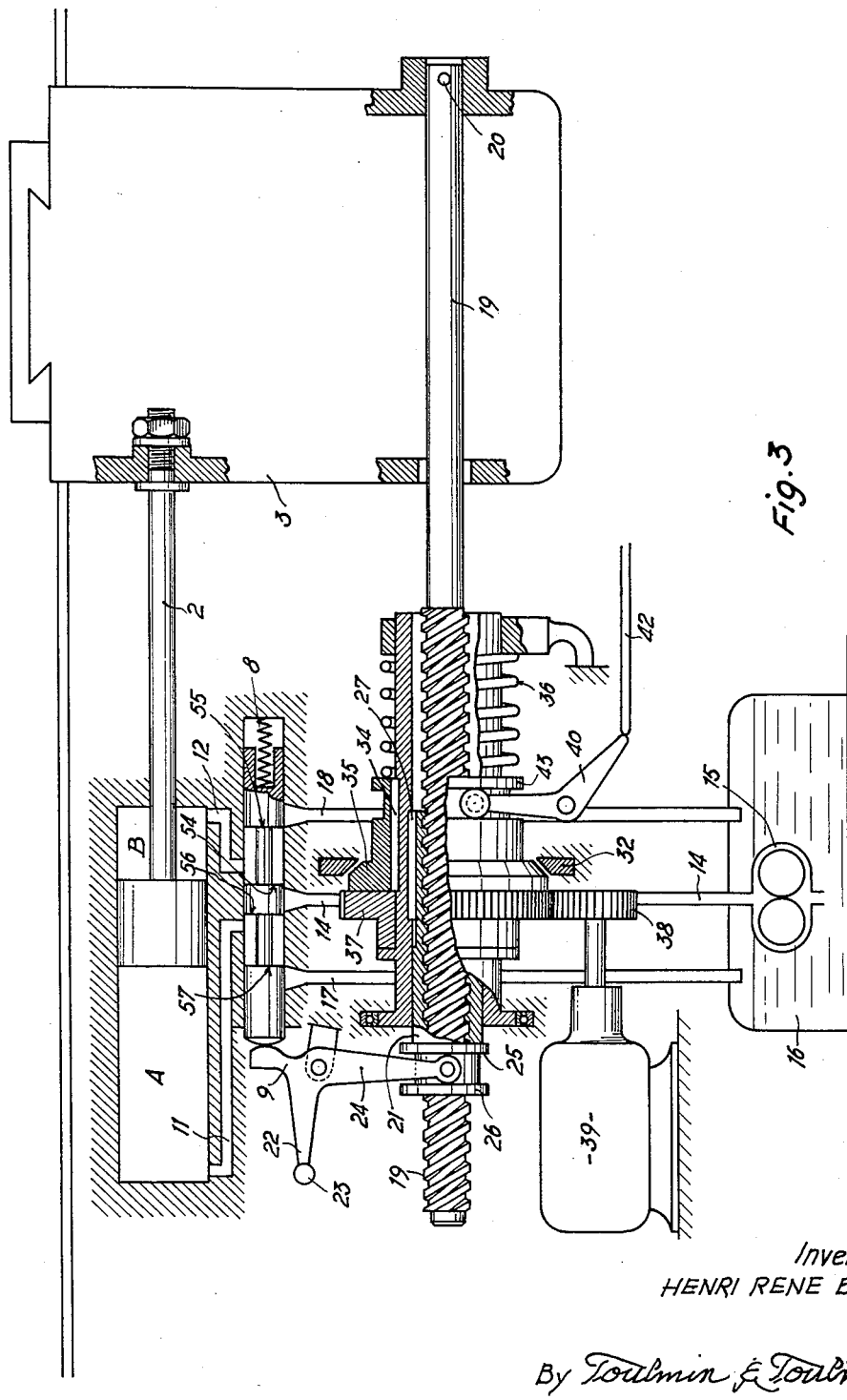

2,994,305
GOVERNING MEANS FOR TRAVELING MEMBERS IN A MACHINE TOOL
Henri Rene Bruet, 14 rue des Pyramides, Paris, France, assignor of one-half to Etablissements A. Cazeneuve, La Plaine-Saint-Denis, France, a company of France
Filed Jan. 20, 1958, Ser. No. 709,940
Claims priority, application France Jan. 31, 1957
12 Claims. (Cl. 121—45)

It has been observed in machine tools that when the feed of tool-support carriages, saddles, work-carrying tables or plates is effected by means other than conventional mechanical means, it is subject to irregularities in the displacement which are sometimes inacceptable. These irregularities result from changes in the resistances encountered, for example from differences in the reaction of the tools on the work being machined, from variations in passive resistances and in the power of the driving motor, and, in the case of a fluid motor drive, from change in the viscosity of the motive fluid with temperature.

The object of the invention is to render this feed regular and independent of the aforementioned disturbing causes by acting on the distribution or the voltage or other controlling factor of the motors utilised, which may be of any type, by means of a mechanical device which has a regular and continuous displacement and which could be conveniently operatively connected to the spindle of the machine tool on which it is mounted.

For example, if the feed is controlled by a fluid motor having a rectilinear or rotary motion, the inlet and outlet valves of the fluid motor are controlled so as to meter the pressure and flow in this motor.

By way of example, such an embodiment of the invention could comprise: An arrangement, which comprises a nut and a screw having a lead which renders relative axial movement between the nut and screw conveniently reversible, the nut and screw being constantly interengaged so that the movement of one imparts movement to the other, apart from lost movement due to play, and thus permits measuring the angle of rotation relative to a fixed reference and constitutes a device having a regularly variable length between the nut and the point of attachment of the screw, said arrangement being such that the nut is driven in rotation either directly or by an automatic or controlled frictional contact or coupling with a feed gearbox, whereas the screw is prevented from rotating either rigidly or also by an automatic or controlled frictional contact or coupling either with the element being moved, such as a carriage, saddle or the like, or with the bed of the machine tool, the nut and the screw or both of them being, furthermore, free to move axially such distance that either the nut or screw is capable of acting directly, or indirectly by way of suitably arranged follow-up connecting means, on the valve or valves controlling the pressure and flow of the motive liquid supplied to the fluid motor driving the carriage, saddle or the like.

The aforementioned arrangement could moreover be utilised alone or in combination with a similar or identical arrangement in tandem or in all the directions required by the type of machine tool to be equipped therewith, these arrangements being, if desired, coupled with power supplies which are successive or have suitable direction and are driven by the feed gearbox or the like.

Further features and advantages of the invention of an application of these arrangements to the drive of a saddle of a lathe will be apparent from the ensuing description with reference to the accompanying drawings to which the invention is in no way restricted.

In the drawings:

FIG. 3 is a somewhat diagrammatic illustration of the device shown in a more detailed manner in FIG. 1.

Figure 1:
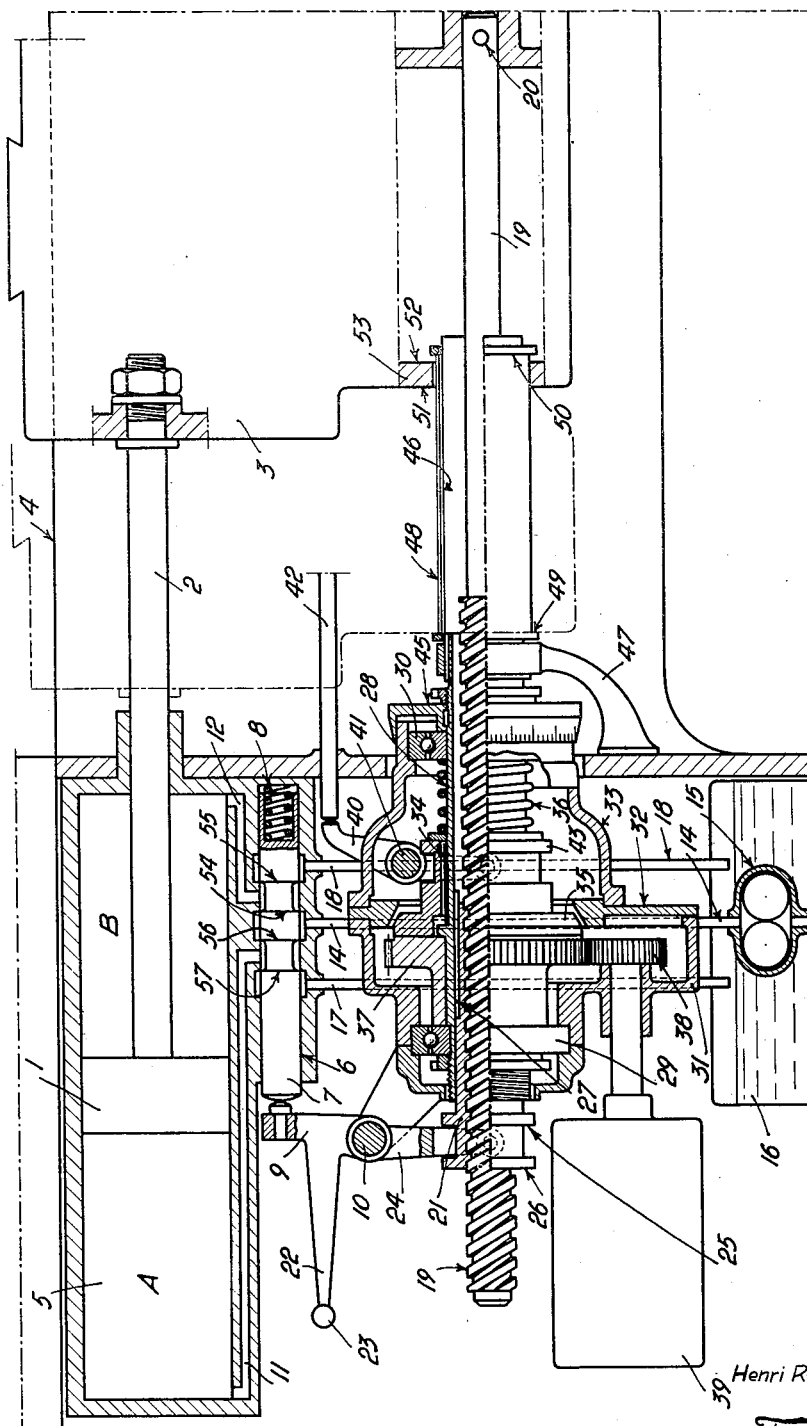
FIG. 1 is a longitudinal diagrammatic partly sectional view, laid out in the plane of the figure, of the hydraulic control of the saddle of a lathe by the means embodying the invention.

In the embodiment shown in FIG. 1, a piston 1 is connected by a rod 2 to a saddle 3 movable along the bed 4 of a lathe and slides in the known manner in a cylinder 5 which it divides into two compartments A and B. This cylinder 5 is connected to the bed 4 and comprises a distributor block 6 in which is movable a cylindrical control valve spool 7 which is biased by a spring 8 in the direction of a lever 9 pivotably mounted on a pivot pin 10. Passageways 11 and 12 put annular grooves in the valve control spool 7 in communication with the ends of the cylinder 5. An annular recess in the block 6 around the part of the valve control spool 7 between the grooves is connected by a pipe 14 to the delivery side of a pump 15, for example a gear pump, immersed in oil contained in a tank 16. Other annular recesses in the block 6 around the valve control spool ends are connected to the tank 15 by return pipes 17 and 18.

A screw 19 is connected to the saddle 3 by a pin 20, or other means which prevents the screw 19 from rotating and moving longitudinally in the saddle 3, and is screw-threadedly engaged in a nut 21 having a corresponding lead. The threads of the screw 19 and nut 21 are suitably inclined relative to their axes so as to constitute a perfectly reversible unit requiring little axial force to effect a relative axial displacement between the screw and nut. An arm 22 having a knob 23 is rigid with the lever 9, which latter is capable of pivoting toward the right and toward the left (as viewed in FIG. 1) relative to the mean position of this lever.

An arm 24, also rigid with the lever 9, is arranged in the form of a fork and is engaged with precision in a recess between two flanges 25 and 26 provided on the nut 21. In the presently-described embodiment, the arm 24 constantly bears against the flange 25 owing to the force of the spring 8 acting on the valve 7. The nut 21 is provided with splines 27 which slidably engage, with light friction, corresponding splines formed in a sleeve 28 carried by antifriction bearings, such as ball bearings 29, 30, supported in axial alignment in a housing rigid with the bed 4. This housing consists of three parts 31, 32 and 33. The sleeve 28 is externally provided with splines 34 in engagement with corresponding splines of a plate 35 which is urged by a spring 36 against a gear 37 rotatable on the sleeve 28 and capable of meshing with another gear 38 which is rotated, for example, by the output shaft of a feed gear-box 39. The force exerted by the spring 36 and the shape and type of the contacting faces are so determined as to create such friction between the gear 37 and the plate 35 that the latter is suitably driven in rotation by rotation of the gear 37. A lever 40, pivotably mounted on a pin 41 and actuated by a rod 42, is capable of bearing against a flange 43, formed on the plate 35, and separating the latter from the gear 37 and, in eliminating said friction, prevent the plate from being driven by the gear 37. This lever 40, in continuing its travel is also capable of urging the plate 35 against the fixed part 32, which is of suitable shape, so as to hold this plate stationary and thus prevent the sleeve 28 and the nut 21 from rotating. Part 32 hence is a braking means and the shiftable member 35 operates as a clutched member when in engagement with the gear 37 and as a brake member when in engagement with said braking part 32.

A cup 45 is centered on the sleeve 28 and suitably held in position relative to the latter. This cup 45 is provided with a vernier scale and caps the part 33 which carries, for example, the fixed reference of the vernier.

A tube 46 is held by a bracket 47 on the bed 4 and surrounds with clearance the end of the sleeve 28 and a part of the screw 19. A second tube 48 is slidably mounted on the tube 46 and can be moved or driven, through the medium of flanges 49, 50 provided thereon, by the sides 51 or 52 of a wall or web 53 of the saddle 3.

The spring 8 is so designed that the thrust it exerts on the lever 9 is never sufficient (with an appreciable and suitably defined margin) to drive the nut 21 along the screw 19 and, owing to the reversibility between the nut and screw, cause sliding between the plate 35 and the gear 37 despite the frictional contact between the latter and the plate produced by the force exerted by the spring 36.

The frictional contact between the gear 37 and the plate 35 is such that the thrust or the traction the nut 21 exerts in performing its function does not result in slip between the gear 37 and the plate 35 and rotation of the nut 21 always corresponds to the rotation of the gear 37 except when releasing the clutch 35, 37. But the effect of this frictional contact must be limited to the aforementioned function so as to allow when necessary the gear 37 and plate 35 to slip easily upon exertion of an admissible longitudinal force in certain movements of the saddle 3 caused by the piston 1.

The device operates in the following manner:

It will be supposed that the whole of the hydraulic circuit and the cylinder are filled with liquid from which air or gas has been carefully removed. In its position shown in FIG. 1, the valve 7 closes the pipes and the pump 15, when started up, delivers the liquid under pressure to the tank 16 through a suitably calibrated delivery valve (not shown in the drawing).

Under these conditions, if the arm 22 is moved upwardly, the lever 9 is moved toward the right and, in opposition to the action of the spring 8, shifts the valve 7 which, through the medium of its shoulder 56, puts the passageways 11 and 14 in communication and, through the medium of its shoulder 55 puts the passageways 12 and 18 in communication. The liquid under pressure flowing through the pipe 14 enters the compartment A of the cylinder 5 while the liquid contained in the compartment B is urged through the pipe 12 and returned to the tank 16 by way of the pipe 18. The interconnected piston 1 and saddle 3 are therefore moved toward the right (as viewed in FIG. 1).

The opposite downward movement of the lever 22 pivots the lever 9 toward the left so that the valve 7, under the effect of the force exerted by the spring 8, moves from its mean position of rest (FIG. 1) and thereafter, through the medium of its shoulder 54, puts the passageways 12 and 14 in communication, and, through the medium of its shoulder 57, puts the passageways 11 and 17 in communication. The liquid under pressure flowing through the pipe 14 enters the compartment B of the cylinder 5 while the liquid in the compartment A is discharged through the pipe 11 and returns to the tank 16 by way of the pipe 17. The piston 1 and the saddle 3 are thus moved toward the left, for example up to the position shown in dot-dash line in FIG. 1.

Abutments (not shown in the drawing) are advantageously provided which enter into action at the end of the travel so as to automatically return the lever 9 to its mean position of rest and thus hold the piston 1 and the saddle 3 in the selected left or right positions relative to the bed 4.

In pivoting, the lever 9 axially shifts the nut 21 which, owing to the aforementioned reversibility, rotates by screwing or unscrewing itself relative to the fixed screw 19 and causes the plate 35 to slip relative to the gear 37.

This slip, rendered possible owing to the reversibility of the screw threads and to the suitable choice of the frictional contact between the plate 35, and the gear 37, as explained hereinbefore, occurs continuously during the uncontrolled movements of the piston 1 and saddle 3 in the course of which the screw 19 causes rotation of the nut 21 and consequently rotation of the sleeve 28 and plate 35.

These movements of translation of the saddle 3 can be used for rapidly putting into position or returning into position tools or work pieces or for disengaging, which save time, but they are generally little suited to the work phases owing to their irregularity.

The indispensable regularity is obtained despite variations in resistance and viscosity, by means of the device of the invention which functions in the following manner:

The feed gearbox 39 connected to the spindle of the lathe (not shown in the drawing) imparts a given rotational speed to the gear 38 which transmits this speed to the gear 37 which in turn transmits the speed to the sleeve 28 and to the nut 21 owing to its frictional contact with the plate 35. If the nut 21 is driven in a counter-clockwise direction (when viewed from its left end), it tends to unscrew itself from the screw 19, which has a right-hand thread, and the flange 25 urges the arm 24 of the lever 9 toward the left and the lever 9 pivots about the pin 10 and displaces the valve 7 toward the right. The shoulder 56 of the valve 7 puts the passageways 11 and 14 in communication and the shoulder 55 of the valve puts the passageways 12 and 18 in communication. Pressure is created in the compartment A and the piston 1 and the saddle 3 connected thereto start moving toward the right, as mentioned hereinbefore. In this movement, the nut 21 assumes a position of equilibrium axially of the screw 19, which is determined by its rotation, its reaction on the threads of the screw 19, and the force exerted by the spring 8. But this position could be disturbed either by an increase or decrease in the speed of the piston 1 and the saddle 3, which are subjected to variable resistances and thrusts. In both cases, the reaction of the nut 21 is immediate.

If the piston 1 and saddle 3 increase their speed of displacement, governed by the nut 21, the latter, while continuing to rotate, is driven axially toward the right by the screw 19 which pivots the lever 9 toward the left and permits the spring 8 to urge the valve 7 in the same direction so that the shoulder 56 tends to decrease the effective cross-sectional area of the inlet for the oil under pressure which flows through the pipe 14 and passes through passageway 11 into the compartment A. The pressure drops are thus increased, the driving force decreases, the piston 1 and saddle 3 slow down and the valve 7 returns to its previous position and they resume their regular displacement determined by the rotation of the gear 38.

If the piston 1 and saddle 3 decrease their speed of displacement governed by the nut 21, the latter continues its rotation but it is returned toward the left by the retarding action of the screw 19 and it exerts a force through the medium of the flange 25 on the arm 24 of the lever 9 which shifts the valve 7 so that the shoulder 56 increases the effective cross-sectional area of the oil inlet for the oil which is delivered by the pump 15 and flows into the compartment A. The pressure drops are less and the driving force is increased and the regular speed, determined by the rotation of the gear 38, is resumed.

Tendencies to speed variation are therefore immediately stopped by the nut 21, whose movements (which are moreover infinitesimal) have an almost instantaneous action, which ensures a movement substantially as regular as that obtained with conventional mechanical drives.

The longitudinal or axial forces which the nut 21 must exert in this function are very small and must not in any case be capable of causing slip between the plate 35 and the gear 37, which would be possible as is clear from the foregoing description.

If it is found advantageous, the rod 42 or similar rods could be caused to exert a thrust on the lever 40 and cause the latter to act on the flange 43 so as to release this friction and also hold the plate 35 stationary against the fixed part 32, which would stop the sleeve 28 and the nut 21 from rotating relative to one another.

During the movements of the piston 1 and the saddle 3, which are regular or otherwise, the cup 41 constituting a vernier constantly participates in the rotation of the nut 21 and sleeve 28 with which it is connected, so that upon each longitudinal displacement of the piston 1, the saddle 3 and the screw 19 there corresponds a rotation of the cup 45 which could thus indicate the measurement of this longitudinal displacement.

The tubes 46 and 48 protect the screw 19 from any undesirable projections and help to keep the screw clean and to maintain a constant coefficient of friction between the screw 19, the nut 21 and the splines 27.

Figure 2:
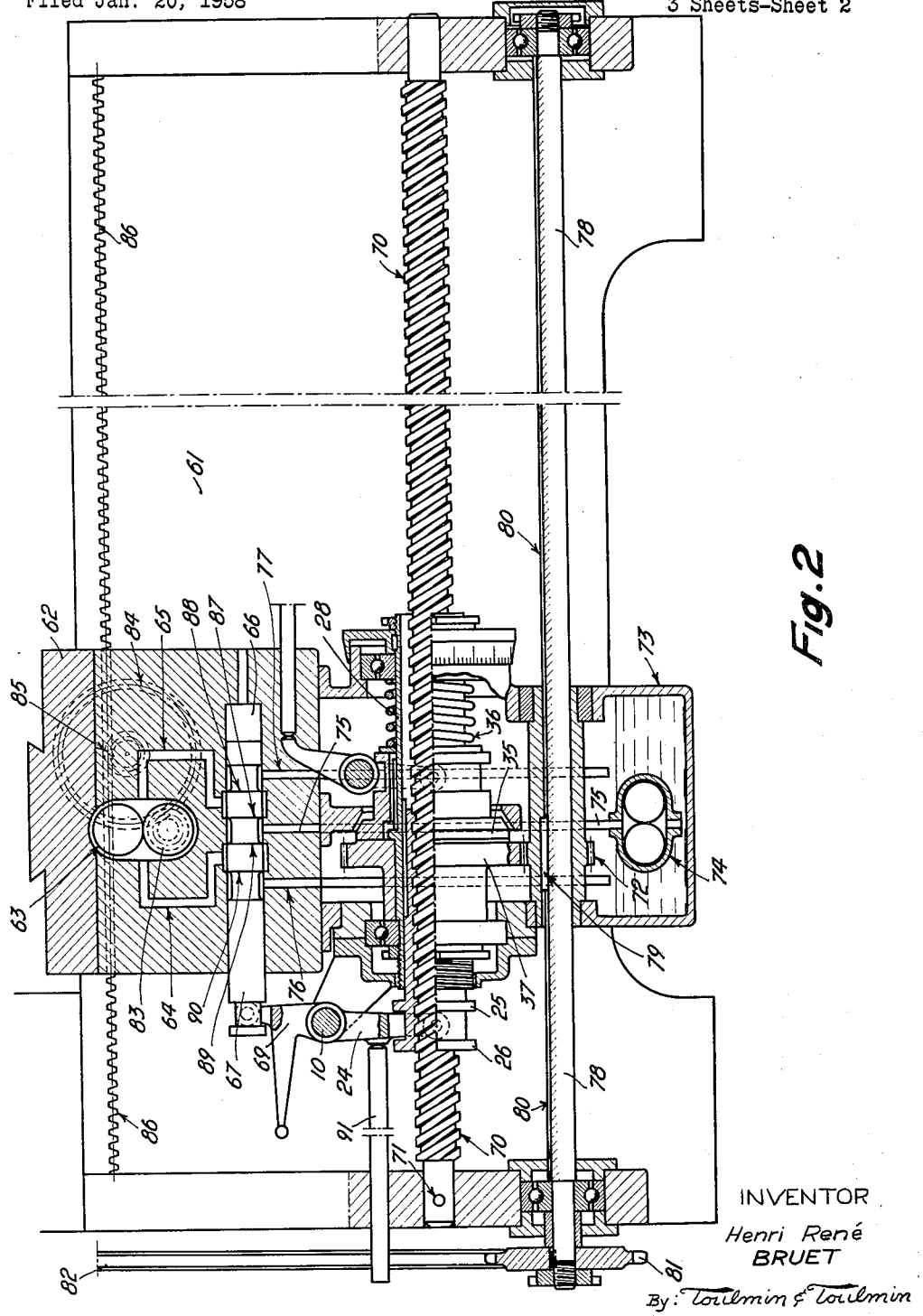
FIG. 2 is a diagrammatic partly sectional view of a modification of the device shown in FIG. 1.

FIG. 2 shows a modification of the device shown in FIG. 1 in which certain elements are movable and, being carried by the saddle, participate in the movement of the device, whereas these elements were fixed in the first described embodiment. The piston and cylinder are replaced by a rotary hydraulic or fluid motor of any known type which bears, through the medium of a suitable speed reduction device, against a rack fixed along the bed of the lathe.

FIG. 2 shows the bed 61 along which the saddle 62 slides, this saddle carrying the fluid motor 63 fed by pipes 64 and 65 communicating with the distributor 66 which has a valve 67 provided with a recess 68 in which is engaged a lever 69 pivotable about a pin 10 and carrying a fork 24 which straddles with precision the nut 21 between flanges 25 and 26 provided on the latter. The nut 21 is capable of screwing itself or unscrewing itself relative to the screw 70 which is parallel with the directions of movement of the saddle 62 along the bed 61 to which latter the screw is fixed by a pin 71 or any other means. The nut 21 is capable of sliding in splines provided in the sleeve 28 for driving the nut in rotation. The plate 35 of the sleeve 28, which is biased by the spring 36, exerts frictional pressure on the gear 37 driven by the gear 72 which is journalled in bearings suitably disposed in the walls of the sump housing 73. Immersed in the liquid provided in the sump 73 is the driving pump 74 which feeds the motor 63 through its delivery pipe 75 whose effective cross-sectional area is controlled by the valve 67 which also controls the return pipes 76 and 77. The gear 72 moves along a bar 78 which drives this gear in rotation through the medium of a key 79 sliding in a key-way 80 provided for this purpose. The bar 78 is driven by any known means, for example by a sprocket 81 and a chain 82 which are driven by a feed gearbox connected to the spindle of the lathe (not shown in the drawing).

A spindle of the motor 63 carries a gear 83 which is meshed with a gear 84 on the shaft of which is keyed a gear 85 which is meshed with the rack 86 rigid with the bed 61.

The screw 70, the bar 78 and the rack 86 are disposed in parallel relation with the direction of movement of the saddle 62 along the entire length of the bed 61 of the lathe. Rods, such as rods 91, can be arranged as abutments so as to act on levers, such as levers 69, and through the medium thereof on valves, such as valves 67, so as to obtain automatic stoppage of saddles, such as saddles 62. The friction provided by the plate 35 and the gear 37 include clutch release means and blocking means similar to those described in respect of the embodiment shown in FIG. 1. In the presently-described embodiment, as in the previously-described embodiment, the screw 70 and the nut 21 constitute a perfectly and essentially reversible unit.

The operation of this device is similar to that of the device shown in FIG. 1.

The whole of the hydraulic circuit, including the fluid motor, is filled with liquid from which air or gas has been carefully eliminated. The valve 67 is shown in its mean position of rest in which it separates the pipes in such manner as to ensure that the motor 63 remains stationary. As soon as it is started up, the pump 74 pumps liquid under pressure from the sump 73 through its delivery valve (not shown in the drawing) which is suitably calibrated.

Under these conditions, if the lever 69 engaged in the recess 68 is pivoted toward the left (as viewed in FIG. 2) by means of the arm rigid therewith or any other means, it shifts the valve 67 in the same direction and the shoulder 89 of this valve puts the passageways 75 and 64 in communication and the shoulder 88 puts the passageways 77 and 65 in communication. The liquid under pressure pumped through the pipe 75 by the pump 74 passes through the passageway 64 into the motor 63, causes the latter to rotate and returns to the sump 73 through the pipes 65 and 77. The motor 63 drives the gear 83 in a clockwise direction which drives the gears 84 and 85. The latter rotates and travels along the rack 86 with which it is in mesh and so shifts the saddle 62 toward the right.

Pivoting the lever 69 in the opposite direction causes, firstly, closure of the pipes owing to the return of the valve 67 to the mean position shown in FIG. 2 and consequently stoppage of the saddle 62. In continuing to pivot the lever 69 in this direction, the shoulder 87 of the valve 67 puts the passageways 65 and 75 in communication so that the liquid under pressure is supplied to the motor 63 and the shoulder 90 of the valve puts passageways 64 and 76 in communication and allows this liquid to return to the sump 73 after it has passed through the motor. The latter operates in the opposite direction to the preceding direction and the gear 83 rotates in a counterclockwise direction so that the gear 85 acts on the rack 86 in such manner as to move the saddle 62 toward the left.

As mentioned in respect of the preceding embodiment, the movements of the saddle 62 result in slip between the plate 35 and the gear 37 owing to the control of the nut 21 by the screw 19 rendered possible by the aforementioned reversibility resulting from the adopted inclination of the threads of the nut and screw.

The desired regular displacement of saddles or the like, for example for the work stages, is obtained in this second embodiment in a manner similar to that described in respect of the embodiment shown in FIG. 1.

In the position shown in FIG. 2, that is the position of rest, the feed gearbox connected to the spindle of the machine (not shown in the drawing) drives, for example through the medium of the chain 82 and sprocket 81, the shaft 78 at a predetermined speed and, through the medium of the key-way 80 and the key 79, this shaft drives the gear 72 which drives the gear 37 which in turn drives the plate 35, the sleeve 28 and the nut 21 owing to the frictional contact between the gear 37 and the plate 35.

If the nut 21 is driven in the clockwise direction (as viewed from the left side of the machine), it screws itself along the screw 70 (which has a right-hand screw thread) and is displaced toward the right (as viewed in FIG. 2). In this movement, it pivots, through the medium of the flange 26, the lever 69 which, through the medium of the recess 68, shifts the valve 67 toward the left so that the shoulder 89 puts the passageways 64 and 76 in communication and the shoulder 88 puts the passageways 65 and 77 in communication. The liquid under pressure flows through the passageway 64 and the motor 63 rotates and drives the saddle 62 toward the right, as explained hereinbefore.

In this movement, the nut 21 moves in a regular manner along the fixed screw 70, this movement being determined by the speed of the output shaft of the feed gearbox and, all things being equal, the saddle 62 also moves in a regular manner along the bed 61.

However, as mentioned hereinbefore, this movement could have a tendency to change owing to variation in the resistances encountered, in the viscosity of the liquid or in the drive of the saddle 62, or for any other reason.

If the speed of the saddle 62 increases, the pin 10, rigid therewith, is displaced toward the right relative to the nut 21, the lever 69, 24 bears against the flange 25 and, through the medium of its other end engaged in the recess 62, shifts the valve 67 toward the right. This decreases the effective cross-sectional area of the passage between the passageways 64 and 76 already opened by the shoulder 89 and decreases the effective cross-sectional area of the passage between the passageways 65 and 77 already opened by the shoulder 88. This results in an appreciable increase in the pressure drop and an appreciable decrease in the driving power of the motor 63, which results in a decrease in the force exerted on the saddle 62 which slows down and resumes the speed determined by the rotational speed of the shaft 78.

If the speed of the saddle 62 decreases, the pin 10, rigid therewith, is displaced toward the left relative to the nut 21, and the lever 69, 24 bears against the flange 26 and, at its other end engaged in the recess 62, shifts the valve 67 which increases the effective cross-sectional area of the passage between the passageways 64 and 76 already opened by the shoulder 89, and increases the effective cross-sectional area of the passage between the passageways 65 and 77 already opened by the shoulder 88. There is a resultant large decrease in the pressure drop and an appreciable increase in the driving power of the motor 63. The force exerted on the saddle 63 increases and the saddle accelerates and resumes the speed determined by the rotational speed of the shaft 78.

The same corrections or compensations of the variations in the speed of the saddle 62 occur irrespective of the direction of its movement, which remains related to that of the nut 21 along the screw 70 within very narrow limits. This provides a displacement substantially equivalent to that obtained with conventional mechanical controls.

The device shown in FIG. 2 also comprises a vernier whose arrangement and operation are similar to those described in respect to the embodiment shown in FIG. 1.

The regulation of the frictional contact or coupling between the plate 35 and the gear 37 is obtained in the manner described hereinbefore, and it will be observed in this second embodiment that, as the valve 67 is controlled positively or directly, there is no need to take into account the effect of a spring such as the spring 8 (FIG. 1) in the determination of this friction.

The release and the blocking of the plate 37 is obtained by means of the same elements and in the same conditions in the two preceding embodiments or in all similar embodiments.

The abutments, such as the abutment 91, are conveniently disposed in the known manner to determine either the stoppage of the saddles or carriages or an automatic alternating movement thereof.

Owing to the arrangement embodying the invention, it is possible to obtain, with considerable advantages, a bearing surface between the nut and the screw which is such that its wear and its localisation are very small during a very long duration of operation, so that the precision of the machine tool is conserved.

Although specific embodiments of the invention have been described, many modifications and changes may be made therein without departing from the scope of the invention as defined in the appended claims, the invention embracing all identical or like devices comprising the application or utilisation of all or a part of the described arrangements.

Thus, the elements of the nut and screw system shown in FIG. 1 may be reversed, the screw being rotative instead of the nut, and the same is true in respect of the embodiment shown in FIG. 2 which may be modified by rotating the screw instead of the nut.

Further, instead of utilizing, for actuating the regulating means of the driving means driving the saddle, the axial displacement of one of the elements of the screw and nut system produced by the force exerted on this element when there is not an exact coincidence between the speed of displacement of the saddle and that permitted by the rotation of said rotating element of the screw and nut system, it is possible to utilize said force itself in causing it to act on a piezo-electric device, for example by holding the element on which it is exerted axially stationary between two piezo-electric devices. The current generated selectively in one or the other piezo-electric device is amplified by appropriate means and varies the electric power supply to an electric motor driving the saddle, or the excitation of two electromagnets controlling the regulating means, for example the valve (such as the valve 7) of a fluid motor, the movable element of each electromagnet moving in opposition to the action of a spring capable of balancing it in various positions in accordance with the intensity of the excitation. These two moving elements of the electromagnets act in opposite directions to one another but each one in only one direction on said valve, which is preferably in constant equilibrium in all its positions.

What I claim is:

1. In a machine control system capable of controlling the traveling speed of a traveling member to maintain said traveling speed in a constant predetermined dependence on the rotary speed of a rotary member of the machine tool, the combination which comprises power means for imparting a traveling motion to said traveling member, control means capable of controlling the power applied by said power means to said traveling member, and governing means comprising a set of two members provided with helical faces and in motion transmitting engagement together through said faces, one of said members being operatively connected to said traveling member in such a manner that said one member has imparted to it a motion whose speed is at each instant in a constant ratio to the speed of travel of said traveling member, and the other of said members being operatively connected to said rotary member in such a manner as to be rotated thereby at a speed depending upon that of the latter, and means responsive to the force exerted by one of the members of said set on the other and interposed between one member of said set and said control means, for actuating the latter in dependence on said force, wherein said set comprises a screw and nut assembly having a reversible lead, said screw and nut being arranged coaxially and in permanent engagement with each other, and the rotatable member of the screw and nut is rotated by a slidable coupling so designed that the coupling force is such as to permit rotation of said member without slip for all cases of normal operation of the governing means but permits said coupling to slip when said force of a member of the screw and nut set upon the other exceeds a predetermined value.

2. The combination defined in claim 1 wherein the rotatable member of the screw and nut set is the nut member of said set, said nut member being rotated by a sleeve coaxially surrounding the screw member of said set and in axially slidable driving engagement with said nut, said coupling being also coaxial with said screw.

3. The combination defined in claim 1 wherein said slidable coupling is a clutch.

4. The combination defined in claim 3 further comprising means for preventing rotation of said rotable member of the screw and nut set and means for actuating the last-mentioned means upon prior release of said clutch.

5. In a machine control system capable of controlling the traveling speed of a traveling member to maintain said traveling speed in a constant predetermined dependence on the rotary speed of a rotary member of the machine tool and comprising the combination of power means for imparting a traveling motion to said traveling member, control means capable of controlling the power applied by said power means to said traveling member, and governing means comprising a set of two members provided with helical faces and in motion transmitting engagement together through said faces, one of said members being operatively connected to said traveling member in such a manner that said one member has imparted to it a motion whose speed is at each instant in a constant ratio to the speed of travel of said traveling member, and the other of said members being operatively connected to said rotary member in such a manner as to be rotated thereby at a speed depending upon that of the latter, and means responsive to the force exerted by one of the members of said set on the other and interposed between one member of said set and said control means, for actuating the latter in dependence on said force, the feature that said set comprises a screw and nut assembly having a reversible lead, said screw and nut being arranged coaxially and in permanent engagement with each other, so that said latter named means are positively actuatable by said set in opposite directions.

6. The combination defined in claim 5 wherein said means responsive to the force exerted by one of the members of the screws and nut set on the other member of the set comprise movement transmitting means for positively transmitting in both directions to said control means, the axial movements of one of said members of the screw and nut set resulting from the force to which it is subjected by the other of the members of the set.

7. The combination defined in claim 5 wherein a single one of said members of the screw and nut set is both driven in translation and in rotation, the other member of said set remaining stationary.

8. The combination defined in claim 7 wherein said stationary member is the screw member of the screw and nut set.

9. The combination defined in claim 8, further comprising at least one other traveling member, at least one other nut member in screw-threaded engagement with said screw, thereby forming a further screw and nut set and means governed by said latter screw and nut set for imparting a traveling motion to said further traveling member at a speed governed by said set.

10. The combination defined in claim 5 wherein the screw member of the screw and nut set is fixed to the traveling member whose speed of displacement is to be governed.

11. The combination defined in claim 5, further comprising a vernier having a rotatable member coaxial and rotatably connected to the member of said screw and nut set which is driven in rotation.

12. The combination defined in claim 5, further comprising a telescopic protecting tube surrounding the screw member of the screw and nut set over a certain part of its length, the ends of said tube bearing respectively against the machine tool structure and against said traveling member.

References Cited in the file of this patent

UNITED STATES PATENTS

| | | |
|---|---|---|
| 2,317,549 | Muller et al. | Apr. 27, 1943 |
| 2,496,369 | Baghuis | Feb. 7, 1950 |
| 2,587,352 | Manning | Feb. 26, 1952 |
| 2,601,157 | LeLan | June 17, 1952 |

FOREIGN PATENTS

| | | |
|---|---|---|
| 770,314 | Great Britain | Mar. 20, 1957 |